June 17, 1924.
H. G. IRWIN
1,498,378
ROTARY CRUST BREAKER
Filed Jan. 3, 1922
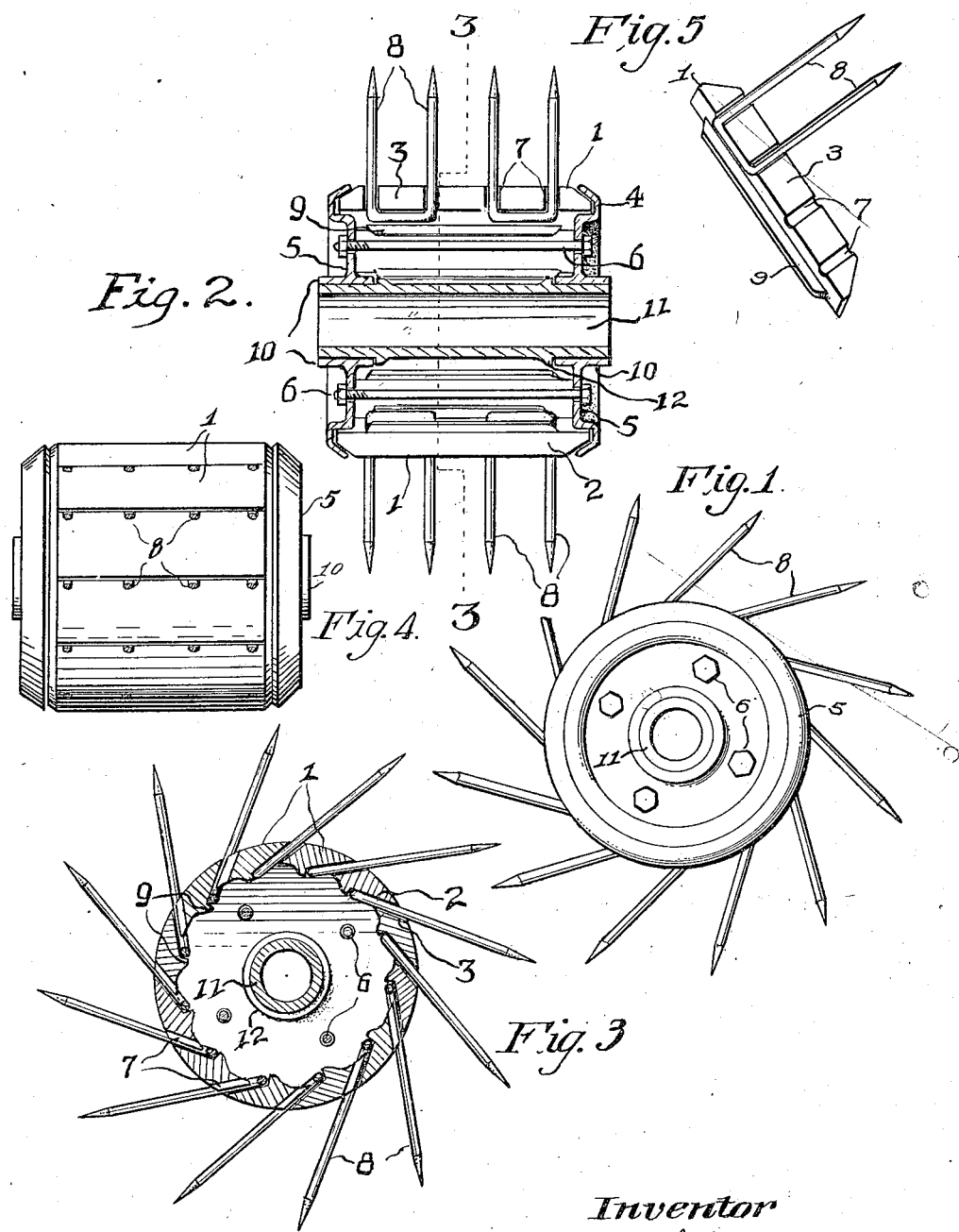
Inventor
Hubert G. Irwin Patented June 17, 1924.

1,498,378

UNITED STATES PATENT OFFICE.

HERBERT G. IRWIN, OF AMARILLO, TEXAS.

ROTARY CRUST BREAKER.

Application filed January 3, 1922. Serial No. 526,522.

*To all whom it may concern:*

Be it known that I, HERBERT G. IRWIN, a citizen of the United States, residing at Amarillo, in the county of Potter and State of Texas, have invented a new and useful Rotary Crust Breaker, of which the following is a specification.

My invention relates to improvements in soil crust breakers in which a cylindrical body carrying projecting tines is adapted for rolling over the soil to loosen the surface crust; and the objects of my improvement are, first, to provide a plurality of short bars arranged in an annular series adjacent one another and adapted to revolve horizontally about a center; second, to provide end plates or heads having annular grooves in which the ends of the bars are disposed for holding same in place; third, to secure the shank portion of soil penetrating tines between the bars; fourth, to provide soil penetrating tines in pairs formed integral; and, fifth, to provide a boxing centrally of the end plates for revolving the tine holding bars and tines about a center. These five stated objects and such other objects as will incidentally appear in the course of the following description are attained in such an agricultural implement as is illustrated in the accompanying drawings, and the invention resides in certain novel features which will be pointed out in the claims following the description.

In the accompanying drawings:—

Figure 1 is an end view of the crust breaker.

Figure 2 is a longitudinal sectional view through the center of same.

Figure 3 is a cross sectional view on line 3—3, of Fig. 2.

Figure 4 is a plan view of the tine holding bar assembly, illustrating the spacing of the tines between the bars, and Figure 5 is a view in perspective of one of the tine holding bars and a pair of tines, illustrating the manner in which the shank portion is arranged in the notches in the side of the bar.

In detail:

Numeral 1 designates a plurality of short bars lying parallel in an annular series with the beveled side portions 2, overlapping the beveled side portions 3 of the adjacent bars, the ends of which are beveled also and mounted in the annular grooves or channels 4 4, of the head members 5 5, and are held in clamping relation by bolts 6, passing through registering openings in the head members.

The beveled side portion 3 of the bars are provided with transversely disposed notches or short grooves 7, in which the shank portions of the tines 8, are arranged and are held in place by the beveled face 2, of the adjacent bar and the ridge 9, formed on the inner side thereof. The said tines are formed in pairs, preferably integral for simplicity, and rigidity in mounting same between the bars. By mounting the tines between the faces 2 and 3 of the bars 1 they will be held inclined several degrees out of parallelism of a radial line extending from their center of revolution, the purpose of which will appear hereinafter.

The head members 5 are provided with hub portions 10, in which the ends of the boxing 11, are mounted. Annular abutments 12, are formed on the boxing adjacent the inner ends of the hub members for holding the boxing in place.

In using the crust breaker, it is mounted on a shaft provided with brackets attachable to other implements (not shown) for rolling same over the surface crust of the soil directly over a row of plants, such as the cotton plant, with the tines revolving point forward thereby, penetrating the crust perpendicularly among the plants and withdrawing inclined several degrees, prying the binding crust up in small pieces around the plants.

Having thus described my invention, what is claimed as new is:

1. The combination, in a rolling soil crust breaker, of a pair of oppositely disposed end plates having annular grooves with an annular series of bars lying parallel between the plates and having their ends mounted in said grooves, a plurality of soil penetrating tines projecting obliquely at intervals from between the bars, and a bushing concentrically mounted in the said end plates; all substantially as set forth.

2. In a soil crust breaker, the combination of a series of bars lying parallel with overlapping side portions mounted for revolving about a center carrying soil penetrating tines projecting obliquely of a radial line extending from their center of revolution, and a bushing mounted at the center of revolution, substantially as shown and described.

3. A soil crust breaker provided with a pair of plates having annular recesses to receive the ends of an annular series of parallel bars, said bars having underlying sides portions provided with transversely disposed grooves at intervals between their ends, tines formed in pairs and mounted in said grooves, a bushing mounted centrally through the end plates, bolts passing through registering openings in the plates for holding the parts together, adapted for rolling over a row of plants with the tines penetrating the soil crust among the plants and prying the crust to bits.

4. In a soil crust breaker, a tine holding member consisting of a bar having a ridge disposed adjacent the shank of a tine.

HERBERT G. IRWIN.